United States Patent [19]

Heucke et al.

[11] Patent Number: 4,731,271

[45] Date of Patent: Mar. 15, 1988

[54] CABLE CONNECTION SLEEVE

[75] Inventors: Karl H. Heucke; Albrecht Ott, both of Hamburg, Fed. Rep. of Germany

[73] Assignee: Minnesota Mining and Manufacturing Company, St. Paul, Minn.

[21] Appl. No.: 20,565

[22] Filed: Mar. 2, 1987

[30] Foreign Application Priority Data

Mar. 27, 1986 [DE] Fed. Rep. of Germany ....... 3610370

[51] Int. Cl.$^4$ ...................... H02G 15/00; H02G 15/18
[52] U.S. Cl. ................... 428/36; 174/DIG. 8; 174/92; 156/49
[58] Field of Search ................... 428/36, 481; 174/DIG. 8, 92; 156/49, 52

[56] References Cited

U.S. PATENT DOCUMENTS 4,380,686  4/1983  Moisson ................ 174/DIG. 8
4,426,413  1/1984  Fentress ............... 428/36
4,511,611  4/1985  Moisson ............... 428/36

FOREIGN PATENT DOCUMENTS 2807154 12/1980  Fed. Rep. of Germany .
1065431  4/1967  United Kingdom .

Primary Examiner—John E. Kittle
Assistant Examiner—James J. Seidleck
Attorney, Agent, or Firm—Donald M. Sell; James A. Smith; John C. Barnes

[57] ABSTRACT

A sleeve for enclosing a cable connection, comprising a bendable sheet adapted to be laid around the cable connection. The sheet has a series of equally spaced longitudinal cuts in at least one marginal portion to be arranged transversely of the longitudinal direction of the cable connection. The cuts subdivide the marginal portion into tongues so that as the sheet is laid around the cable connection, the tongues can be laid with a partial overlap tapering down onto the cable sheath at the end of the cable connection. The longitudinal cuts are formed by cutting lines which extend in a direction deivating from the longitudinal direction so that the free ends of the tongues are offset with respect to the base portions of the tongues in a direction transversely of the longitudinal direction.

9 Claims, 3 Drawing Figures

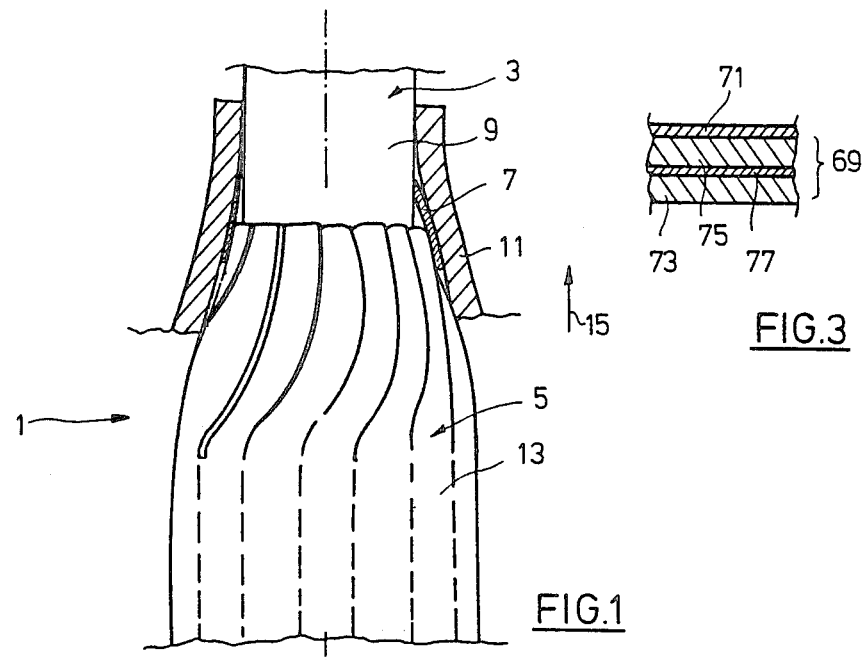
FIG.3
FIG.1
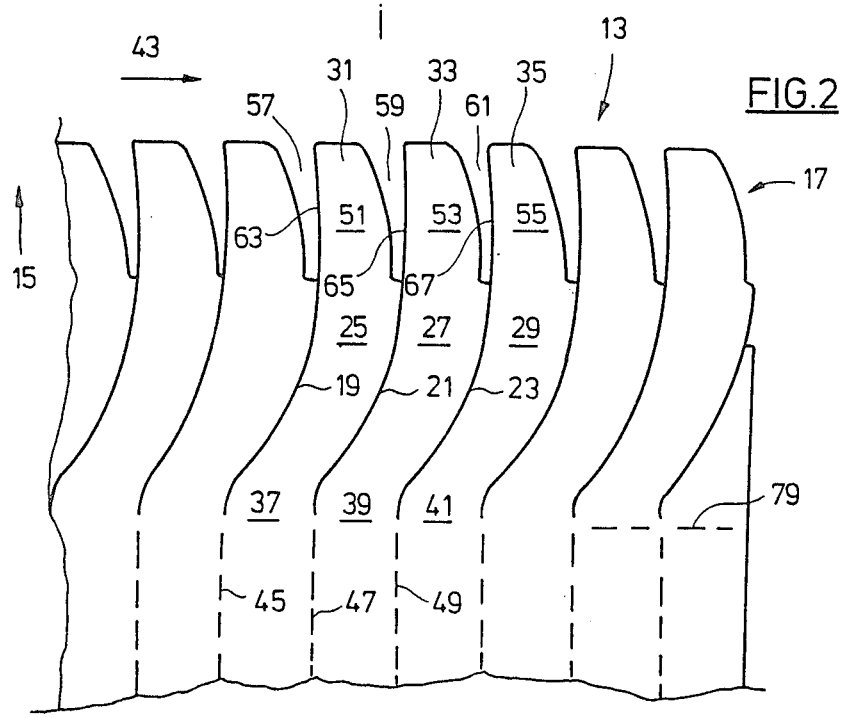
FIG.2

CABLE CONNECTION SLEEVE

FIELD OF THE INVENTION

The invention relates to a sleeve for enclosing a cable connection around which an insulating tape may be wrapped or a heat shrink sleeve may be shrunk to form a cable closure.

BACKGROUND OF THE INVENTION

Sleeves for enclosing a cable connection formed from a bendable sheet laid around the cable connection are frequently used to protectively surround cable connections prior to the application of insulating tape or a heat shrink sleeve to form a cable closure. The sheet may have a series of equally spaced longitudinal cuts in at least one marginal portion to be arranged transversely of the longitudinal direction of the cable connection, the cuts subdividing the marginal portion into tongues so that when the sheet is being laid around the cable connection to form the sleeve, the tongues can be tapered down onto a cable sheath at the end of the cable connection. Such a sleeve is disclosed in British Pat. No. 1,065,431.

As compared to sleeves in which instead of the longitudinal cuts, broader cutouts which triangularly enlarge outwards are provided, as that of German Gebrauchsmuster No. 73 32 638, those with longitudinal cuts offer the advantage that the tongues overlap significantly on the tapering end portion of the cable connection and after being held in place, for example, insulating tape or a heat shrink sleeve, contribute to a high strength of the sleeve and the overall cable closure. However, when laying the sheet around the cable connection, a certain care and skill is necessary in order to lay the tongues with a uniform and unidirectional overlap onto the tapering end portion of the cable connection. According to British Pat. No. 1,065,431, this can be facilitated by making the longitudinal cuts with a scissors or the like so that at least one longitudinal edge of each tongue is bent out of the face of the sheet.

SUMMARY OF THE INVENTION

A sleeve for enclosing a cable connection, comprising a bendable sheet adapted to be laid around the cable connection. The sheet has a series of equally spaced longitudinal cuts in at least one marginal portion to be arranged transversely of the longitudinal direction of the cable connection. The cuts subdivide the marginal portion into tongues and are formed by cutting lines which extend in a direction deviating from the longitudinal direction so that the free ends of the tongues are offset with respect to the base portions of the tongues in a direction transversely of the longitudinal direction.

In the sleeve of the present invention, the desired overlap of the tongues will easily result when laying the sheet around the cable connection if the marginal portion of the sheet is manually clasped and the handed rotated in the offsetting direction of the tongues. Moreover, due to the offset between the free ends and the base portions of the tongues, greater strength will result from the sleeve and its fastening means, for instance a wrapping with insulating tape or a heat shrink sleeve.

Preferably, the cutting lines extend at least partly along a smooth curve and terminate in the longitudinal direction between the base portions of the tongues. Thereby, laying of the sheet around the cable connection to form the sleeve is facilitated, and the formation of highly stressed corners is avoided.

THE DRAWING

In the drawing:

FIG. 1 is a diagrammatic partial view of a sleeve according to the invention enclosing a cable connection.

FIG. 2 illustrates a partial view of the sheet of which the sleeve is formed.

FIG. 3 illustrates a diagrammatic partial sectional view of the layered structure of the material of the sleeve.

DESCRIPTION OF THE PREFERRED EMBODIMENT

FIG. 1 shows a portion of a cable connection 1 between a cable 3 and a second cable which is not illustrated. Around the cable connection, a sleeve 5 is laid which was formed from an essentially rectangular flat sheet. The end of the sleeve 5 is fixed, for example, by a wrapping 7 of insulating tape, to the sheath 9 of the cable 3. An outer enclosure 11 may consist of a heat shrink sleeve shrunk down on the sleeve 5 to form the completed cable closure.

FIG. 2 shows a portion of one end of the essentially rectangular flat sheet 13 from which the sleeve 5 is made. As FIGS. 1 and 2 illustrate, the sheet 13 has, in a marginal portion 17 extending transversely of the longitudinal direction 15 of the cable connection, a series of equally spaced cutting lines 19, 21, 23 which extend generally longitudinally, and subdivide the marginal portion 17 into tongues 25, 27, 29 so that the tongues, when lead around the cable connection, as illustrated in FIG. 1, can be laid with an overlap tapering down onto the cable sheath 9 at the end of the cable connection. The cutting lines extend in a direction deviating from the longitudinal direction 15 so that the free ends 31, 33, 35 of the tongues are unidirectionally offset with respect to base portions 37, 39, 41 of the tongues in a direction 43 transversely of the longitudinal direction 15. As can be seen from FIG. 2, the offsetting of the tongues 25, 27, 29 amounts to about one tongue width in the embodiment illustrated. As can be seen from FIG. 1, the tongues will easily overlap each other when the sheet is laid around if the marginal portion 17 of the sheet 13 is manually clasped and the hand rotated in the offsetting direction 43 of the tongues.

In the embodiment illustrated, the cutting lines 19, 21, 23 extend smooothly and at least partly curvedly and terminate between the base portions 37, 39, 41 in the longitudinal direction 15. The sheet has longitudinal folding lines 45, 47, 49 which merge with the cutting lines 19, 21, 23 at the base portions 37, 39, 41 of the tongues 25, 27, 29. The tongues 25, 27, 29 have end portions, 51, 53, 55 of reduced width. This is obtained in the embodiment illustrated in that in the end portions 51, 53, 55, the cutting lines 19, 21, 23 are widened oppositely to the offsetting direction 43 to form cutouts 57, 59, 61. The other edge of the cutouts are formed by outer end portions 63, 65, 67 of the cutting lines which again extend in the longitudinal direction.

FIG. 3 shows that in the embodiment illustrated, the sheet consists of a base material 69 which is provided on one side, namely, the outer side of the sleeve 5, with a metal layer 71. As FIG. 3 also shows, the base material 69 of the embodiment illustrated consists of two thin layers 73, 75 which are interconnected by a connection layer 77 to form a composite sheet. The layers 73, 75 preferably consist of polyester. The metal layer 71 may be formed for instance by a vapor-deposited metallization, or a glued-on metal foil.

It is desirable that the sleeve have a preferential direction of increased strength, for example by having been worked. This can be generated, for instance, by a rolling process, for instance in the manufacture of a plastic sheet used as the base material. Thereby, the sheet can be easily laid around the cable connection but yet have an increased strength against deformation in a perpendicular direction. Thereby, the strength of the sleeve and thus of the overall cable connection closure can be further increased. Particularly in the case of an increased strength against deformations from the longitudinal direction 15, it may be appropriate to provide a transverse folding line 79 in the area of the inner ends of the tongues in order to facilitate the laying-on of the tongues.

If the sleeve 5 extends across the whole length of the cable connection, it is appropriately provided in a corresponding manner with cutting lines and tongues in the marginal portion (not illustrated) opposite of the marginal portion 17.

We claim:

1. A sleeve for enclosing a cable connection, comprising a bendable sheet adapted to be laid around the cable connection, the sheet having a series of equally spaced longitudinal cuts in at least one marginal portion to be arranged transversely of the longitudinal direction of the cable connection, the cuts subdividing the marginal portion into tongues, the cuts being formed by cutting lines which extend in a direction deviating from the longitudinal direction so that the free ends of the tongues are offset with respect to the base portions of the tongues in a direction transversely of the longitudinal direction, whereby when the sheet is being laid around the cable connection the tongues can readily be laid with a partial overlap tapering down onto the cable sheath at the end of the cable connection.

2. The sleeve of claim 1 wherein the cutting lines extend at least partly along a smooth curve and terminate between the base portions in the longitudinal direction.

3. The sleeve of claim 1 wherein the sheet comprises longitudinal folding lines which extend in the longitudinal direction and merge with the cutting lines at the base portions of the tongues.

4. The sleeve of claim 2 wherein outer end portions of the cutting lines extend in the longitudinal direction.

5. The sleeve of claim 3 wherein the tongues comprise end portions of reduced width.

6. The sleeve of claim 1 wherein the offset of the tongues amounts to about one tongue width.

7. The sleeve of claim 1 wherein the sheet consists of a base material which is provided on one side with a metal layer.

8. The sleeve of claim 7 wherein the base material consists of a plurality of interconnected layers of plastic.

9. The sleeve of claim 7 wherein the base material has a preferential direction of increased strength due to having been worked.

* * * * *